United States Patent
Cheff et al.

(10) Patent No.: US 9,849,582 B2
(45) Date of Patent: Dec. 26, 2017

(54) ROLLAWAY STORAGE CART WITH COLLAPSIBLE LEGS

(71) Applicant: Mobile Designs & Innovations, LLC, Chesterfield, MO (US)

(72) Inventors: Gerard Cheff, White Lake, MI (US); Robert Crump, Manchester, MO (US)

(73) Assignee: Mobile Designs & Innovations, LLC, Chesterfield, MO (US)

( * ) Notice: Subject to any disclaimer, the term of this patent is extended or adjusted under 35 U.S.C. 154(b) by 0 days.

(21) Appl. No.: 14/708,456

(22) Filed: May 11, 2015

(65) Prior Publication Data

US 2016/0332292 A1 Nov. 17, 2016

(51) Int. Cl.
- B25H 1/12 (2006.01)
- B25H 1/04 (2006.01)
- B62B 3/00 (2006.01)

(52) U.S. Cl.
CPC ................. B25H 1/04 (2013.01); B25H 1/12 (2013.01); B62B 3/00 (2013.01)

(58) Field of Classification Search
CPC ......... A47B 13/02; A47B 37/00; A47B 46/00; A47B 83/00; A47B 83/04; B25H 1/04; B25H 1/12; B62B 3/027; B62B 5/0003
USPC .......... 312/237, 240, 249.8; 280/43.1, 43.17, 280/640, 651; 144/286.1; 296/20
See application file for complete search history.

(56) References Cited

U.S. PATENT DOCUMENTS

| | | | | |
|---|---|---|---|---|
| 3,980,334 A | * | 9/1976 | Ferneau | A61G 1/0565 280/43.17 |
| 4,921,295 A | * | 5/1990 | Stollenwerk | A61G 1/0293 296/20 |
| 5,863,052 A | * | 1/1999 | Roman | B23D 47/025 144/286.1 |
| 6,045,150 A | * | 4/2000 | Al-Toukhi | B62B 3/027 248/676 |
| 6,070,899 A | * | 6/2000 | Gines | B62B 5/0003 280/43.1 |
| 6,976,696 B2 | * | 12/2005 | O'Krangley | A61G 1/0562 280/638 |
| 7,637,550 B2 | * | 12/2009 | Menna | A61G 1/013 296/19 |
| 2004/0111798 A1 | * | 6/2004 | Matunaga | A61G 1/0293 5/86.1 |
| 2006/0006628 A1 | * | 1/2006 | Fields | B25H 1/04 280/640 |
| 2009/0314187 A1 | * | 12/2009 | Miller | B25H 1/04 108/25 |
| 2010/0065593 A1 | * | 3/2010 | Campbell | B60R 9/065 224/42.32 |
| 2011/0266821 A1 | * | 11/2011 | Goto | A61G 1/048 296/20 |

(Continued)

Primary Examiner — James O Hansen
(74) Attorney, Agent, or Firm — Lewis Rice LLC

(57) ABSTRACT

The present invention discloses a portable work station that provides a strong work surface combined with a significant volume of secure tool storage. The disclosed invention allows a single user to collapse, load, transport, unload, assemble and move the apparatus to a specific work area without assistance. Once at the designated work site, the apparatus of the present invention can be locked in place, preventing unwanted motion during use. Further, the disclosed invention provides an adjustable height work surface that includes the ability to transport large construction materials safely.

10 Claims, 6 Drawing Sheets

(56) References Cited

U.S. PATENT DOCUMENTS

2012/0275896 A1* 11/2012 Magill ............... A61G 1/056
                                                          414/800

* cited by examiner

ROLLAWAY STORAGE CART WITH COLLAPSIBLE LEGS

This is a non-provisional utility patent application within the meaning of 35 USC 111(a).

BRIEF DESCRIPTION

The subject of this invention relates generally to multi-purpose storage devices. Specifically, the present invention provides two primary functions: a portable work surface and storage for tools and materials or other goods. Further, the apparatus is constructed such that a single user is able to load/unload the apparatus from and elevated surface, for example, the bed of a pickup truck, the deck of a flatbed trailer or a bench.

BACKGROUND OF THE INVENTION

Humans have worked with tools for millennia. Humans have also used work surfaces for the same amount of time. Generally the tools and the work surfaces are co-located such as in a workshop or factory, but from time to time the need arises to accomplish work away from the location of the tools. When that occurs, both the tools and the work surface must be, at least to some extent, portable. The alternative is to have separate sets of tools and work surfaces at one or more remote work sites. This is highly inefficient.

Contemporarily many solutions exist separately. That is, there are numerous examples of work surfaces or work stations that can be collapsed, carried to a remote worksite and then assembled. Some of these devices are small, but some are also sized to handle construction level tasks. While some of these devices are simple "folding table" type devices, others have multiple functions embedded, for example a set of vise jaws to clamp a work item.

Also in existence are many examples of tool carriers and/or storage devices. The classic tool box is an example, but modernly there are a large number of devices that have wheels and handles capable of carrying a large number of tools. Some of these devices even have a small reinforced surface for standing or, conceivably, providing a small work surface. This class of devices includes the ubiquitous two wheeled dolly used by delivery services and movers.

As noted just above, both portable work surfaces and tool carriers exist, thus it would make sense to combine the devices into a single unit accomplishing both the need for a work surface and the need to store the tools required to accomplish the work. Also as noted, there are examples of small sized devices which can both transport tools and be used as a small work surface, but these devices are sized such that the work surface is not practical for even mid-sized tasks and can only carry small tools. By combining the functions of a bench scale work surface and a tool storage device capable of handling larger tools, a user could move about from site to site with only a single unit to manage.

Making the above combination portable is also a logical step in the evolution of this type of device. However, at this time, while some examples do exist, they exhibit numerous drawbacks which make them difficult to use and less than optimum for the designated tasks. The primary drawbacks are size and ease of use. Many examples of portable tool storage devices may be found that include a work surface, but unfortunately the surface is neither large enough nor sturdy enough to allow a user to accomplish even simple on-site tasks involving large or heavy materials. A further drawback is the weight of the loaded device. In general, two people are required to load/unload this type of device due to both size and weight.

As a direct result, contemporary examples of combination work surface/tool storage devices are difficult to use or too small to be practical. This is so because supposing that the device is large enough and strong enough to accomplish tasks involving large and/or heavy materials, it is difficult, if not impossible, for a single user to easily move, lift, transport or set up. Given that the device is supposed to be portable, it must necessarily collapse into a size that is able to fit in the bed of a truck or store in the corner of a garage or on-site tool shed.

What would be desirable is a portable apparatus that provides a stable, strong work surface capable of holding large material as well as providing secure storage for a significant number of tools. What would be additionally desirable is that this apparatus be capable of being collapsed, loaded into a work vehicle, transported, unloaded from the work vehicle, assembled and then moved to the specific work area by a single user.

SUMMARY OF THE INVENTION

The present invention discloses a portable work station that provides a strong work surface combined with a significant volume of secure tool storage. The disclosed invention allows a single user to collapse, load, transport, unload, assemble and move the apparatus to a specific work area without assistance. Once at the designated work site, the apparatus of the present invention can be locked in place, preventing unwanted motion during use. Further, the disclosed invention provides an adjustable height work surface that includes the ability to transport large construction materials safely.

The apparatus of the present invention consists of a rectangular volume approximately three feet wide by seven feet long with a depth of approximately eight inches. The top surface of the rectangular volume is attached to a first side such that the top may be opened or closed. Within the rectangular volume, and covered by the top are one or more compartments for storing tools or materials. In a first embodiment the top is a single surface. In a second embodiment the top surface is split into three separate pieces, each capable of being opened or closed independently, and each with its own storage compartment.

Extending from the bottom surface of the rectangular volume are two sets of folding legs, one set located near the front surface and one set near the rear surface of the rectangular volume. Each set of folding legs has a plurality of holes along its length to allow the work surface height to be adjusted by a locating means. Each set of legs also has a set of wheels at its extremity to allow the apparatus to be moved easily by a single user. The wheels near the front surface of the rectangular volume are fixed, while the wheels at the rear of the rectangular volume are of the swivel type to allow easy maneuvering by a single user. Lastly, each of these sets of legs is collapsible such that in the closed state they disappear into the underside of the rectangular volume allowing the apparatus to roll on a pair of stationary wheels mounted on the perimeter of the rectangular volume.

In operation, and supposing that the apparatus in sitting in the bed of a vehicle, for example a pickup truck, a user pulls the unit using the pulling bar at the rear of the apparatus until the rear set of legs drops down and locks in place using a locking means. The user continues to pull the apparatus until the front set of legs drops and locks in a similar manner.

Once both sets of legs have dropped and locked, the apparatus is ready to me moved to the specific work location.

When the apparatus needs to be reloaded, the user pushes the unit against a transport surface, for example the bed of the pickup truck, while releasing the front leg locking means causing the front legs to collapse into the frame. As the apparatus continues to be pushed forward, the rear leg locking means is released causing the rear legs to collapse, allowing them to be pushed into the frame in the transport condition. Once done, the rectangular volume now rolls on the stationary set of wheels mounted to the rectangular volume until it is completely loaded into the truck.

As well as the advantages discussed above, other advantages of the present invention are discussed below in conjunction with the drawings and figures attached.

DETAILED DESCRIPTION OF PREFERRED EMBODIMENTS

Figure 1:
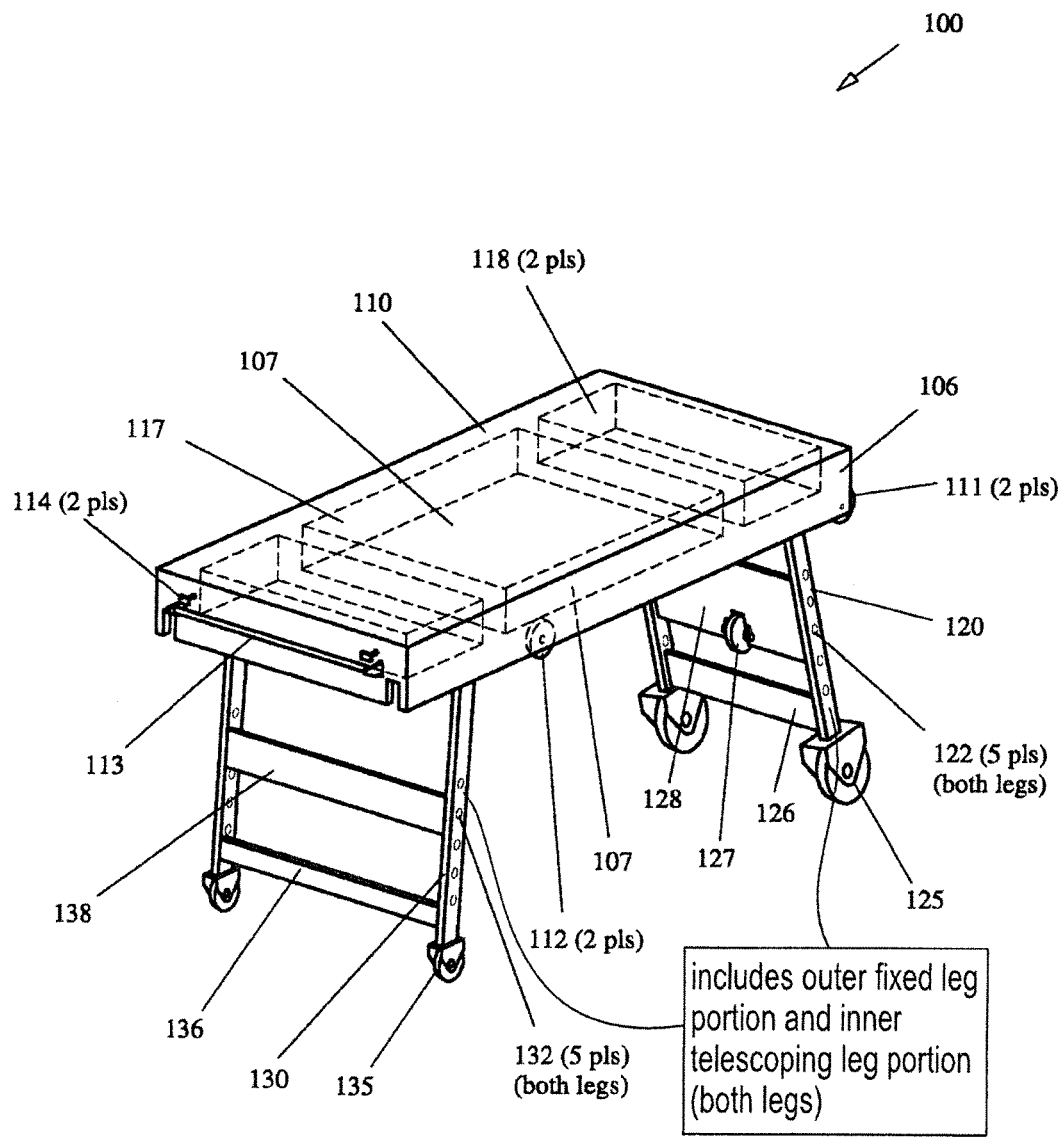
FIG. 1: is an overall view of the apparatus of the present invention.

As described briefly above, the apparatus of the present invention provides substantial improvement for the combination of work surface/tool storage devices. FIG. 1 shows the apparatus of the present invention 100. The apparatus has a rectangular volume 106 comprised of a front surface, a rear surface a first side surface and a second side surface. The rectangular volume has a bottom surface 107 as well as two internal cross braces [not shown]. The two cross braces form three separate storage compartments 117 and 118 that are used for storage. In a preferred embodiment, a top surface 110 is attached to one of the first side of the rectangular volume 106 such that it covers the storage compartments and is capable of being locked to secure the contents of the storage compartments. In a second embodiment, the top surface is divided into three separate parts allowing each of the storage compartments to be accessed individually. Each section of the top surface is suitably hinged to the rectangular volume in the same manner as the single piece top surface 110, but is not shown for clarity since this is well understood by those of skill in the art.

At the front of the rectangular volume a first set of roller wheels 111 are attached. Approximately two thirds of the way from the front surface of the rectangular volume along the long sides of the rectangular volume a second set of roller wheels 112. Each of these sets of roller wheels 111 and 112 are mounted to the rectangular volume of the apparatus in such a way as to avoid interference during loading and unloading. The combination of these wheels function to allow the apparatus to be rolled easily along a transport surface, for example the bed of a pickup truck or a flatbed trailer. At the rear end of the apparatus a handle bar 113 is attached. The handle bar 113 has two functions: first, to allow a user to easily pull or push the apparatus into/out of transport vehicles, and second, to activate the latch mechanism which releases the rear collapsing telescoping legs 130. Also on the rear of the apparatus are two latch buttons 114 that function to release the locking mechanism of the front collapsing telescoping legs 120. These latch buttons 114 are positioned near the ends of the handle bar 113 within easy reach of a user's thumbs.

Both sets of collapsing telescoping legs 120 and 130 have disposed along their length height adjustment holes 122 and 132 respectively. The height adjustment holes 122/132 are used to allow the user to set the working height of the top work surface 110. In a preferred embodiment the height adjustment holes 122/132 are stabilized by a spring-loaded detents. In a second embodiment the height adjustment holes 122/132 are stabilized by a lynch pins. Since both of these methods are well understood by those of skill in the art they are not shown in detail to aid in clarity; however, the lack of a detailed discussion is not meant to limit the scope of the invention. Further, numerous other means for stabilizing the height adjustment holes could be used without departing from the spirit of the invention.

Both sets of collapsing telescoping legs 120 and 130 have cross braces to provide lateral stability. Cross braces 126 and 128 serve to stabilize the front set of collapsing telescoping legs 120, while cross braces 136 and 138 serve to stabilize rear set of collapsing telescoping legs 130. Although the preferred embodiment of the present invention has a pair of cross braces on each set of collapsing telescoping legs, it will be understood that more or fewer cross braces could be used without departing from the spirit of the invention.

The front set of collapsing telescoping legs 120 has a set of fixed wheels 125 attached to the ends. The rear collapsing telescoping legs 130 have a set of swivel wheels 135 attached to the ends. The combination of these wheels 125 and 135 allow a user to easily move the apparatus about when the collapsing telescoping legs are in the deployed position. In the collapsed state the wheels 125/135 disappear into the rectangular volume of the apparatus as discussed below in detail in conjunction with FIGS. 2 and 3. The combination of the fixed wheels 125 and the swivel wheels 135 allow a user to easily maneuver the apparatus of the present invention even when the top surface 110 is loaded with material.

As well as the set of fixed wheels 125 attached to the ends, the front set of collapsing telescoping legs 120 has a secondary loading wheel 127. This secondary loading wheel 127 is located at the center of the cross brace 128 and serves to prevent the front set of collapsing telescoping legs 120 from hitting the transport surface onto which the apparatus is being loaded, thereby preventing any damage to that surface. This is particularly important when loading the apparatus of the present invention into a pickup truck.

FIGS. 2 and 3 provide a discussion of the method of operation of apparatus of the present invention. Starting with FIG. 2A, a user has positioned the apparatus 100 at the rear of a pickup truck 500 with the front collapsing telescoping legs 120 touching the tailgate 510. At this time the weight of the apparatus 100 is entirely supported by the collapsing telescoping legs 120 and 130. Note that at this time the secondary loading wheel 127 is in close proximity to the tailgate 510, such that any movement of the apparatus 100 toward the front of the pickup truck 500 will cause the secondary loading wheel 127 to contact the tailgate 510. Note also at this time that the first set of wheels 111, while located over the tailgate 510, have not yet taken up the weight of the apparatus 100.

Figure 2A:
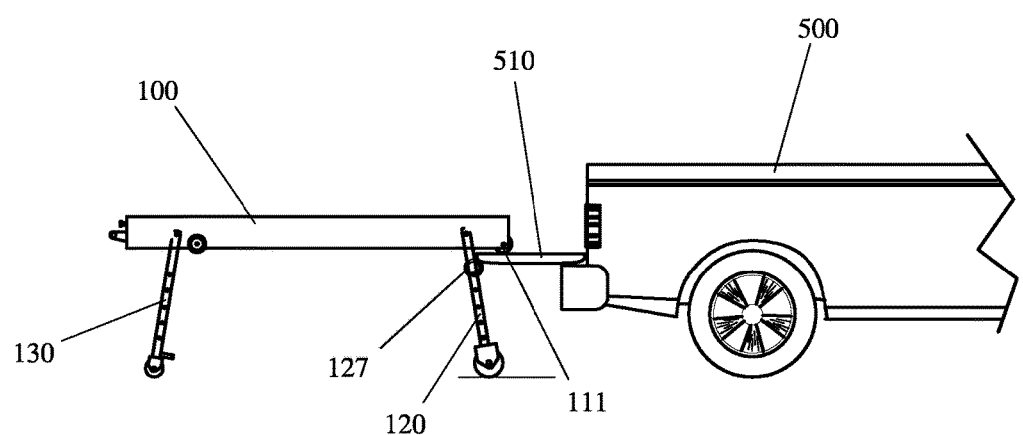
FIG. 2A: describes the first step of loading the present invention into the bed of a pickup truck.
Figure 2B:
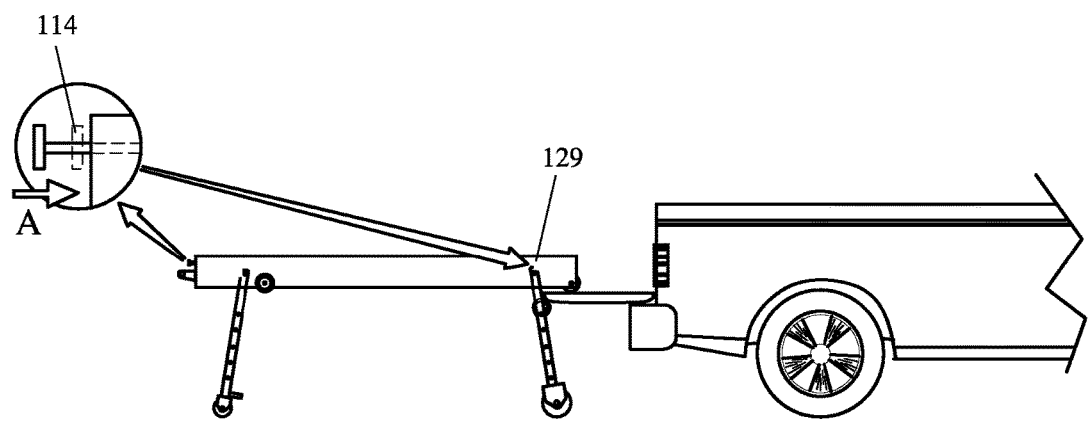
FIG. 2B: describes the second step of loading the present invention into the bed of a pickup truck.

FIG. 2B details the release of the front leg locking mechanism 129 by depressing the latch buttons 114 at the rear of the apparatus 100 of FIG. 2A. By pushing the latch buttons 114 in direction A, the locking mechanism 129 is released allowing the front collapsing telescoping legs 120 to rotate upwards into the rectangular volume of the apparatus 100 of FIG. 2A. At this time the weight of the apparatus 100 is taken up by the first set of roller wheels 111 of FIG. 2A. Also at this time the secondary loading wheel 127 [FIG. 2A] has contacted the tailgate 510 of pickup truck 500 such that the set of collapsing telescoping legs 120 never touches the tailgate 510. It is important to note that at no time during the loading/unloading of the apparatus does the user bear any of the weight.

Figure 2C:
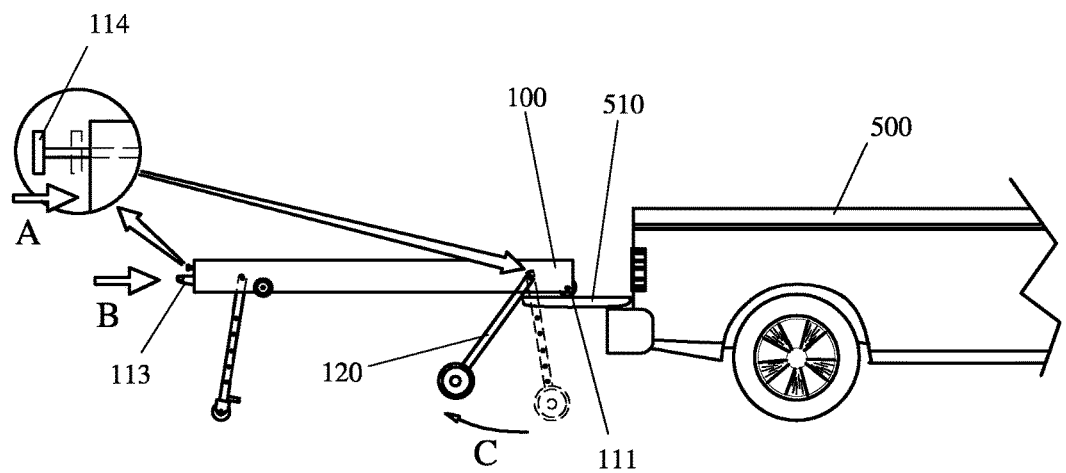
FIG. 2C: describes the third step of loading the present invention into the bed of a pickup truck.
Figure 2D:
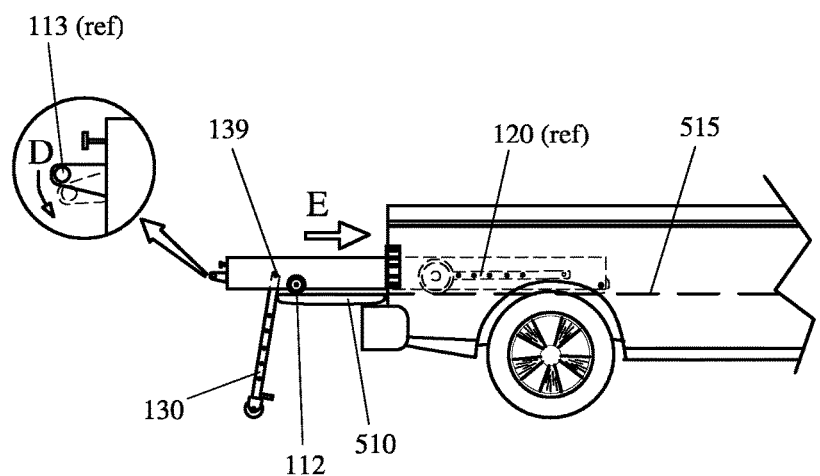
FIG. 2D: describes the fourth step of loading the present invention into the bed of a pickup truck.

Looking now at FIG. 2C, the user has begun pushing the apparatus 100 into the pickup truck 500 in direction B using the pull bar 113 while maintaining the depression of the latch buttons 114 in direction A. As the front collapsing telescoping legs 120 pivot in direction C, some of the weight of the apparatus 100 is transferred to the first set of roller wheels 111 which now rest on the tailgate 510. In FIG. 2D the apparatus of the present invention has moved into the pickup truck bed 515 in direction E a sufficient distance to allow the front collapsing telescoping legs 120 to disappear into the rectangular volume. At this time the second set of roller wheels 112 attached to the rectangular volume are positioned over the tailgate 510 and the rear collapsing telescoping legs 130 are in contact with the tailgate 510. The user now pushes the pull bar 113 downward in direction D releasing the latching mechanism 139 for the rear collapsing telescoping legs 130 allowing the rear collapsing telescoping legs 130 to rotate upwards.

Figure 3A:
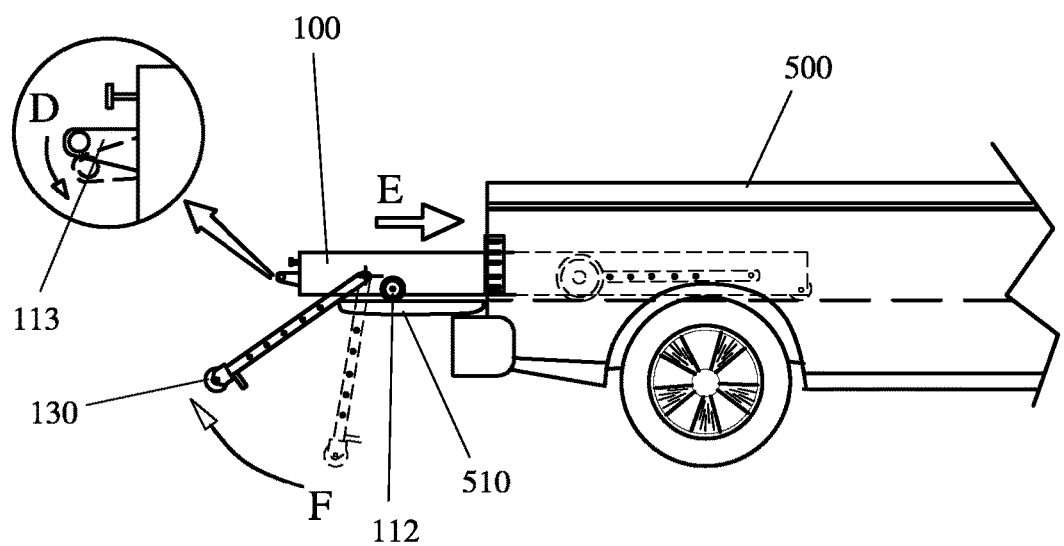
FIG. 3A: describes the fifth step of loading the present invention into the bed of a pickup truck.
Figure 3B:
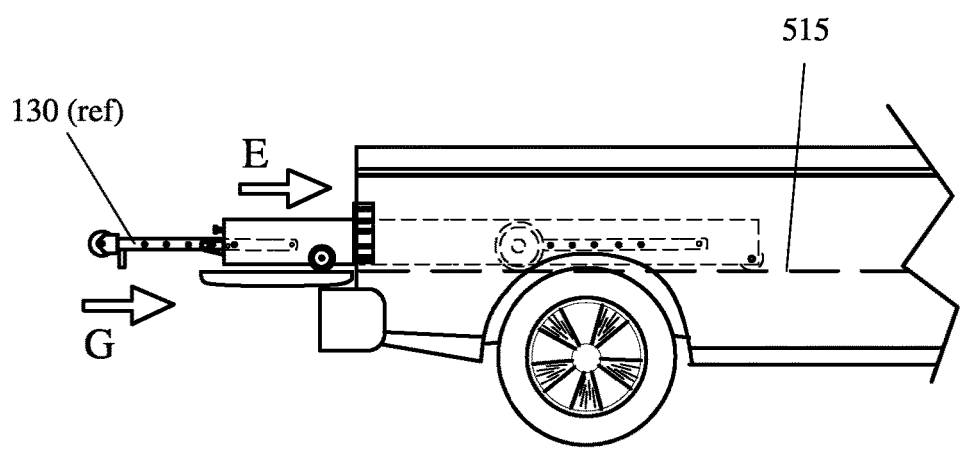
FIG. 3B: describes the sixth step of loading the present invention into the bed of a pickup truck.
Figure 3C:
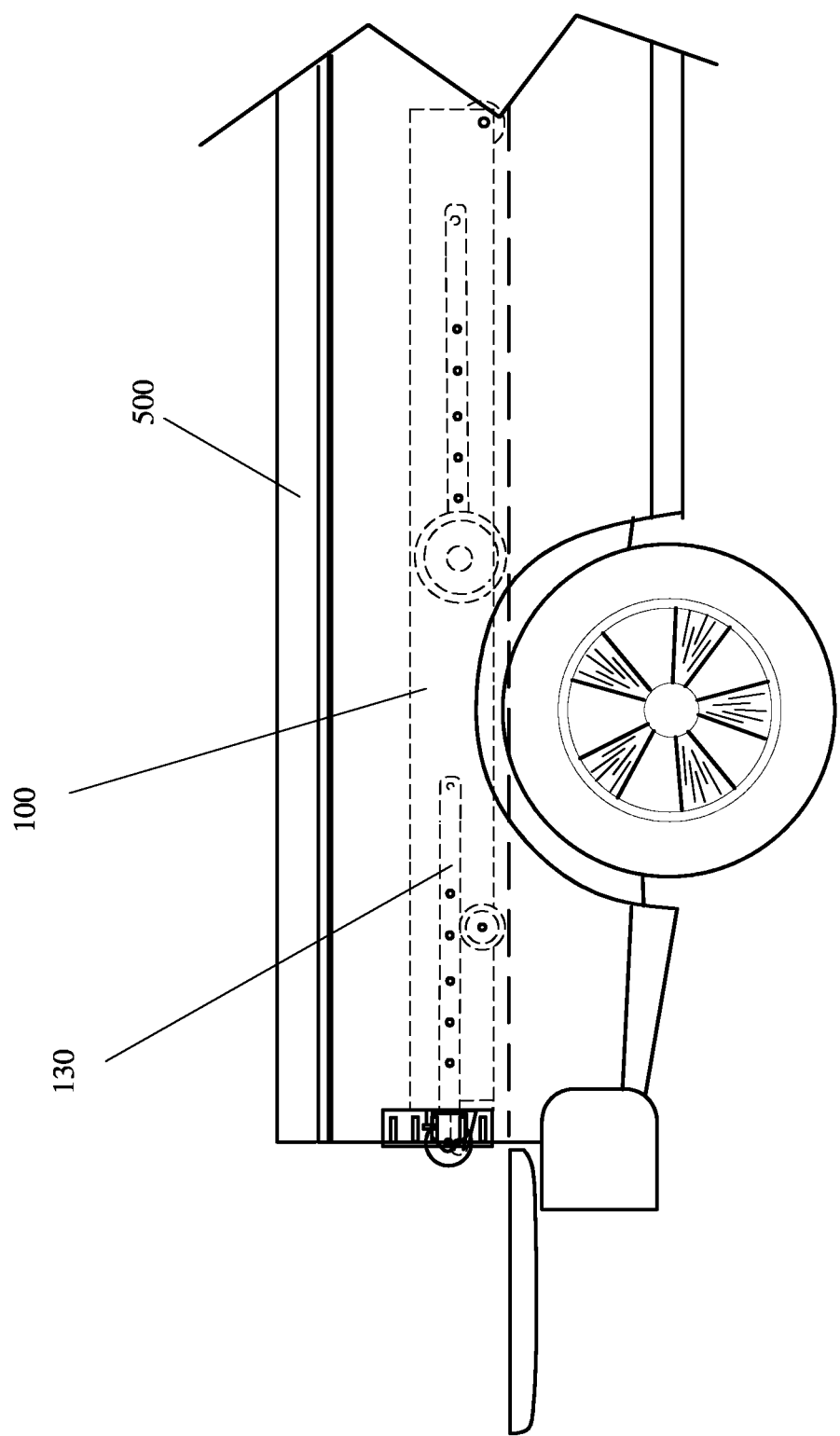
FIG. 3C: describes the completed loading the present invention into the bed of a pickup truck.

Turning now to FIG. 3A, the user has continued to urge the apparatus 100 further into the pickup truck 500 in direction E. Since the pull bar 113 has been pushed in direction D and remains there, rear collapsing telescoping legs 130 rotate upwards in direction F toward the rectangular volume of the apparatus 100. At this time the full weight of the apparatus 100 is transferred from the rear collapsing telescoping legs 130 to the tailgate 510 via the second set of roller wheels 112. Again it is important to note that at no time is any of the weight of the apparatus 100 borne by the user. In FIG. 3B the user has pushed the apparatus 100 further into the bed of the pickup truck 515 in direction E such that the rear collapsing telescoping legs 130 are now parallel to the rectangular volume. At this point the user will push the rear collapsing telescoping legs 130 in direction G until they disappear into the rectangular volume of the apparatus. FIG. 3C shows the apparatus 100 fully inserted into the pickup truck 500 and the rear collapsing telescoping legs 130 placed entirely within the rectangular volume. At this point in time the apparatus 100 is ready for transport.

Note that while a pickup truck was described for this process it is exemplary only and in not meant as a limitation on the scope of the invention. For example, the apparatus could just as easily be loaded onto a flatbed trailer or a stationary work bench.

Figure 4A:
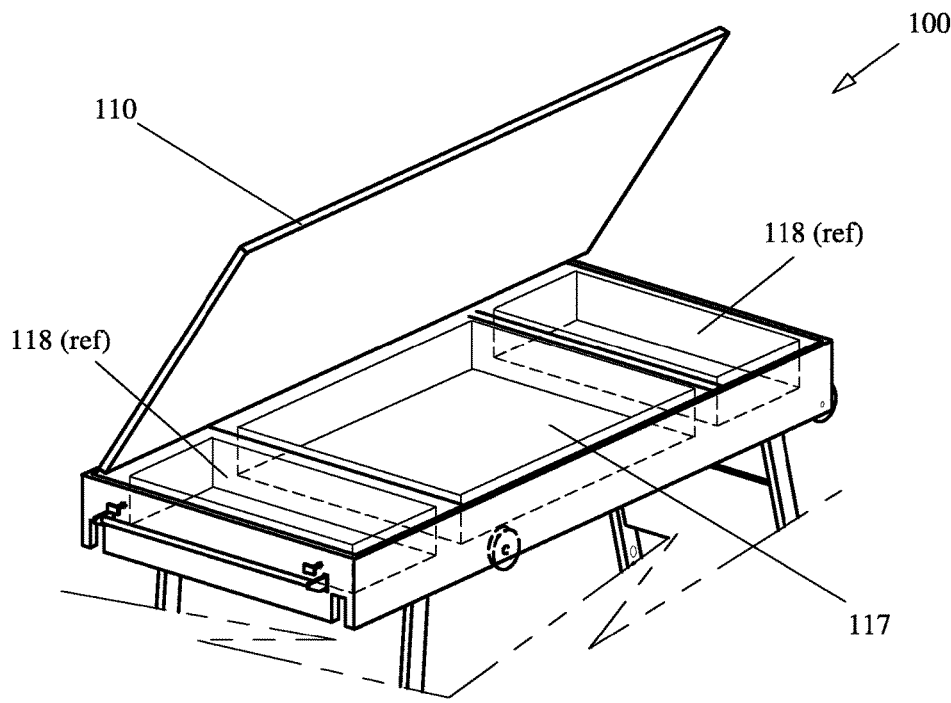
FIG. 4A: describes a first embodiment of the top surface of the present invention.

Referring now to FIG. 4, two embodiments of the present invention are shown. FIG. 4A shows the preferred embodiment of the apparatus 100 of the present invention. In this embodiment a single top surface 110 is used to form the top work surface to covering all three of the storage compartments 117 and 118. The top surface 110 has a lock that allows the contents of the compartments 117 and 118 to be secured. Note that the locking mechanism is well understood by those of skill in the art and is not shown for clarity; however, the lack of detailed discussion of the locking mechanism should not be considered as a limitation on the scope of the invention.

Figure 4B:
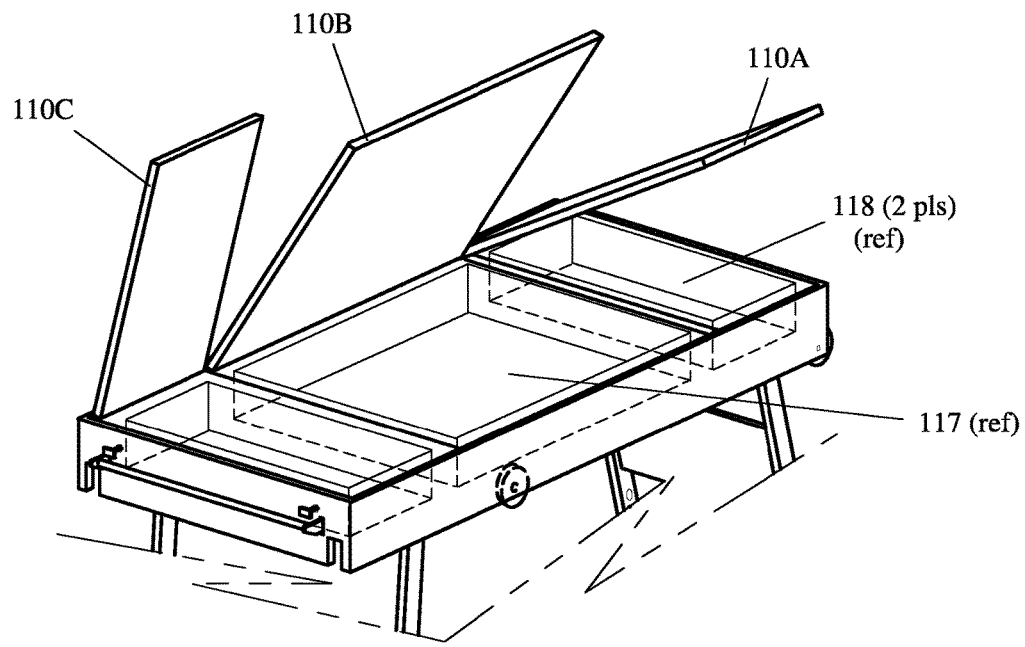
FIG. 4B: describes a second embodiment of the top surface of the present invention.

In FIG. 4B a second embodiment of the apparatus of the present invention is shown. This second embodiment has the same three separate storage compartments 117 and 118, but rather than a single cover, three separate top surfaces 110A, 110B and 110C are shown. In this embodiment, each of the separate top surfaces 110A, 110B and 110C operate independently but form a single top working surface when closed. Each of the top surfaces 110A, 110B and 110C are also capable of being separately locked thereby providing security for the items stored in the storage compartments 117 and 118. As with the first embodiment described above the locking mechanism is well understood by those of skill in the art and is not shown for clarity; however, the lack of detailed discussion of the locking mechanism should not be considered as a limitation on the scope of the invention.

One advantage of the present invention is the ability of a single user to load/unload a large portable work surface capable of storing tools and moving materials. This is accomplished through the use of locking, collapsing telescoping legs that disappear into a rectangular volume.

A second advantage of the present invention is that it provides secure storage for tools and materials. The apparatus of the present invention has at least two embodiments, each with the capability to securely store tools and materials.

A third advantage of the present invention is the ability to move materials safely about a work site. This is accomplished through the stabilized collapsible telescoping legs and associated cross bracing.

A fourth advantage of the present invention is that the height of the top surface may be adjusted to accommodate a variety of work site situations. Each of the sets of collapsing telescoping legs of the apparatus has a series of holes disposed along its long axis. These holes use a locating means to lock the collapsing telescoping legs at a specific height.

A fifth advantage of the present invention is that at no time during the loading/unloading process does the user bear any of the weight of the apparatus. This is accomplished via the two sets of rectangular volume mounted wheels. Thus even if the apparatus is loaded with materials, the user never bears any of the weight significantly improving safety.

What is claimed is:
1. A combination mobile storage cart and adjustable height work bench comprising:
   a rectangular volume, said rectangular volume further comprised of;
      a front surface;
      a rear surface, said rear surface having a handle bar and a pair of latch buttons, one of said pair of latch buttons disposed on each end of said rear surface wherein said handle bar is used both to control a rear latch mechanism and to urge said rectangular volume into and out of a transport condition and said pair of latch buttons control a front latch mechanism;
      a first side surface;
      a second side surface;
      a bottom surface;

a top surface, said top surface having one or more sections hingably attached to said first side surface, said one or more sections being capable of being locked;

a first set of roller wheels fixably mounted in close proximity to the front surface of said rectangular volume;

a second set of roller wheels fixably mounted two thirds of the way from said front surface of said rectangular volume;

one or more storage compartments formed by said front surface, said rear surface, said first side surface, said second side surface, said bottom surface and said top surface, said one or more storage compartments being accessible by the one or more of said hingably attached sections of said top surface;

a front pair of collapsible telescoping legs hinged at said front of said rectangular volume, said front pair of collapsible telescoping legs further comprised of;

a front outer fixed leg portion and a front inner telescoping leg portion, said front outer fixed leg portion and said front inner telescoping leg portion having a plurality of front mating height adjustment holes;

a set of fixed wheels, one of said set of fixed wheels disposed at the end of each of said front inner telescoping leg portions;

said front latch mechanism capable of locking said front pair of collapsible telescoping legs in a locked position, and;

a secondary loading wheel disposed in the center of said front set of collapsible telescoping legs approximately one third of the way from the bottom surface of said rectangular volume;

a rear pair of collapsible telescoping legs hinged at said rear of said rectangular volume, said rear pair of collapsible telescoping legs further comprised of;

a rear outer fixed leg portion and a rear inner telescoping leg portion, said rear outer fixed leg portion and said rear inner telescoping leg portion having a plurality of rear mating height adjustment holes;

a set of rotatable wheels, one of said set of rotatable wheels disposed at the end of each of said rear inner telescoping leg portions, and;

said rear latch mechanism capable of locking said rear pair of collapsible telescoping legs in a locked position such that when said handle bar of said rectangular volume is used to pull said mobile storage cart from a transport condition said rear pair of collapsible telescoping legs pivot downward until said rear pair of collapsible telescoping legs are disposed in said locked position, and upon further pulling from said transport condition said front pair of collapsible telescoping legs pivot downward until said front pair of collapsible telescoping legs are disposed in said locked position wherein said locked front pair of collapsible telescoping legs and said locked rear pair of collapsible telescoping legs support said rectangular volume allowing said rectangular volume to be urged in any direction upon said fixed set of wheels on said front pair of collapsible telescoping legs of said rectangular volume and said rotatable set of wheels on said rear pair of collapsible telescoping legs of said rectangular volume.

2. The rectangular volume of claim 1 wherein the length of said rectangular volume is sixty-five inches, the width of said rectangular volume is twenty-eight and one half inches and the depth of aid rectangular volume is eight inches.

3. The rectangular volume of claim 1 wherein the top surface is a single section.

4. The rectangular, volume of claim 1 wherein the top surface has three separate sections.

5. The rectangular volume of claim 1 wherein the height of the top surface of said rectangular volume may be set from twenty-eight inches to forty-eight inches by adjusting said height adjustment holes of said front pair of collapsible legs and said rear pair of collapsible legs.

6. The front mating height adjustment holes and the rear mating height adjustment holes of claim 1 wherein said front mating height adjustment holes and the rear mating height adjustment holes are fixed in place by spring loaded detents.

7. The front mating height adjustment holes and the rear mating height adjustment holes of claim 1 wherein said front mating height adjustment holes and the rear mating height adjustment holes are fixed in place by lynch pins.

8. The top surface of claim 1 wherein said top surface is made from wood.

9. The top surface of claim 1 wherein said top surface is made from aluminum.

10. The front surface, rear surface, first side surface, second side surface and bottom surface of the rectangular volume of claim 1 wherein said front surface, said rear surface, said first side surface, said second side surface and said bottom surface are made from aluminum.

* * * * *